(12) United States Patent
Benthien et al.

(10) Patent No.: US 12,715,568 B2
(45) Date of Patent: Aug. 25, 2026

(54) ROD WITH ATTACHMENT SOCKETS FOR A TRUSS STRUCTURE OF A VEHICLE

(71) Applicant: Airbus Operations GmbH, Hamburg (DE)

(72) Inventors: Hermann Benthien, Hamburg (DE); Matthias Hegenbart, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 246 days.

(21) Appl. No.: 18/734,317

(22) Filed: Jun. 5, 2024

(65) Prior Publication Data

US 2024/0417055 A1 Dec. 19, 2024

(30) Foreign Application Priority Data

Jun. 14, 2023 (EP) .................................... 23179263

(51) Int. Cl.
*B64C 1/06* (2006.01)

(52) U.S. Cl.
CPC .................................. *B64C 1/066* (2013.01)

(58) Field of Classification Search
CPC .. B64C 1/066; B64C 1/00; F16B 7/00; B64D 11/00; B64D 2011/0046
See application file for complete search history.

(56) References Cited

U.S. PATENT DOCUMENTS 1,843,364 A * 2/1932 Hoekstra .................. B64C 3/00 403/174
4,806,042 A * 2/1989 Swank ..................... F16B 3/00 403/101
7,028,442 B2 * 4/2006 Merrifield ............... E04C 3/005 52/645
7,716,897 B2 * 5/2010 Merrifield ............. B64G 99/00 52/645
7,891,608 B2 * 2/2011 Rawdon .................... B64C 1/08 244/119
9,216,705 B2 * 12/2015 Rebolloso ................ H02G 3/32
10,329,005 B2 * 6/2019 Nandalochana ....... B64D 11/00
10,589,832 B2 * 3/2020 Nandalochana .......... B64C 1/08
12,565,301 B2 * 3/2026 Benthien ................. B64C 1/066
2003/0041548 A1 * 3/2003 Merrifield ............. B64G 99/00 52/646

(Continued)

FOREIGN PATENT DOCUMENTS

EP 4187110 A1 5/2023

OTHER PUBLICATIONS

European Search Report for corresponding European Patent Application No. 23179263.1 dated Nov. 24, 2023.

*Primary Examiner* — Rodney Mintz
(74) *Attorney, Agent, or Firm* — Greer, Burns & Crain, Ltd.

(57) ABSTRACT

A rod with attachment sockets for a truss structure of a vehicle. The rod comprises an elongated body having a plurality of attachment sockets formed on and distributed over an outer side of the body. The plurality of attachment sockets comprises at least a first number of attachment sockets facing in a first direction and a second number of attachment sockets facing in a second direction different from the first direction. The plurality of attachment sockets each comprises a cavity open to the outer side of the body and comprising at least one bearing surface.

16 Claims, 8 Drawing Sheets

(56) References Cited

U.S. PATENT DOCUMENTS

| | | | | |
|---|---|---|---|---|
| 2006/0107611 | A1* | 5/2006 | Merrifield | B64G 99/00 52/646 |
| 2008/0272236 | A1* | 11/2008 | Rawdon | B64C 1/08 244/119 |
| 2014/0197217 | A1* | 7/2014 | Rebolloso | B64C 1/00 224/401 |
| 2017/0291675 | A1* | 10/2017 | Nandalochana | B64C 1/08 |
| 2019/0308714 | A1* | 10/2019 | Nandalochana | B64D 11/003 |
| 2023/0234694 | A1* | 7/2023 | Benthien | B64C 1/066 244/119 |
| 2024/0360858 | A1* | 10/2024 | Wei | F16B 7/00 |
| 2025/0002175 | A1* | 1/2025 | Poppe | B64C 1/061 |

* cited by examiner

ROD WITH ATTACHMENT SOCKETS FOR A TRUSS STRUCTURE OF A VEHICLE

CROSS-REFERENCES TO RELATED APPLICATIONS

This application claims the benefit of European Patent Application Number 23179263.1 filed on Jun. 14, 2023, the entire disclosures of which are incorporated herein by way of reference.

FIELD OF THE INVENTION

The present invention relates to a rod for a truss structure of a vehicle. Further, the present invention relates to a system for building a truss structure of a vehicle comprising such rod. In addition, the present invention relates to a vehicle comprising such rod and/or system.

BACKGROUND OF THE INVENTION

Various fasteners, connectors and attachments may be used to connect components in vehicles. Their configuration and/or design may depend on the nature, size, weight, and installation position of the installation elements concerned. For example, in a vehicle compartment or cabin, truss-like frame structures may be used to attach a component to a ceiling or a side part of the vehicle.

For example, document EP 4 187 110 A1 describes a truss structure for an interior of a vehicle, comprising at least one articulated connector and a plurality of components in the form of truss rods arranged on the at least one articulated connector for forming the truss structure. Although this may be used to build a truss structure, it is desirable to provide more flexibility when building a truss structure.

SUMMARY OF THE INVENTION

It is therefore an object of the present invention to provide a flexible way of building a truss structure for a vehicle.

According to a first aspect, there is provided a rod for a truss structure of a vehicle. The rod comprises an elongated body having a plurality of attachment sockets formed on and distributed over an outer side of the body. The plurality of attachment sockets comprises at least a first number of attachment sockets facing in a first direction and a second number of attachment sockets facing in a second direction, different from the first direction. Further, each of the plurality of attachment sockets comprises a cavity open to the outer side of the body and comprising at least one bearing surface.

The proposed rod may serve or may be configured as a truss rod having integrated a plurality of attachment options in the form of the plurality of attachment sockets. It may therefore serve both as a truss rod and for attaching and/or connecting other components. This makes the rod multi-functional. Regardless of where the rod is installed, it provides the plurality of attachment sockets on its outer side for attaching another component, connecting to another rod to form a truss structure, etc., so that a suitable attachment to the same may be identified in virtually any installation position of the rod. This allows an especially flexible truss structure and/or truss structure-like attachment of components, counter elements, counter structure, or the like in a vehicle. Also, this allows high flexibility in the arrangement of components of the vehicle.

For example, the plurality of attachment sockets may be distributed along the elongated extension of the rod and/or body, i.e., along its longitudinal axis. Further, the plurality of attachment sockets may be distributed around the circumference, the peripheral surface, and/or over the outer surfaces of the rod and/or body. The directions in which the attachment sockets, in particular the first number of attachment sockets and/or the second number of attachment sockets, face may be related or referred to the longitudinal axis of the rod and/or body. Accordingly, the first direction and the second direction may extend at least substantially perpendicularly away from the longitudinal axis of the rod. Attachment sockets facing different directions may accordingly be docked from different directions and/or angles by a component, further rod, etc. to be attached to them. The attachment sockets from the first number of attachment sockets may be arranged at least substantially opposite or adjacent to the attachment sockets from the second number of attachment sockets. There may also be more than two numbers of attachment sockets. For example, if the rod has an angular cross-section, causing the body to have four lateral and two end surfaces, attachment sockets may also be formed on more or all of the outer surfaces, respectively. The number of attachment sockets may be greater than or equal to one, wherein multiple attachments sockets provide correspondingly more attachment options in different directions of the rod.

The respective cavity of the plurality of attachment sockets may have different cross-sections and/or body shapes. For example, these may be at least substantially round, at least substantially spherical, angular, polygonal, or the like. A wide range of cross-sections and/or body shapes are possible, if they are suitable for forming a stable core of the panel, which may be determined, for example, by calculation, modeling, simulation, testing, or the like. Merely by way of example, the cavity may have an at least substantially and/or partial spherical form or shape, thereby forming a bubble core. In another example, the cavity may have a polygonal form or shape, e.g., a truncated pyramid or the like, thereby forming a rectangular core. In at least some embodiments, the respective cavity of the plurality of attachment sockets may open to the interior of the vehicle, and may be configured, particularly by its at least one bearing surface, to at least partially receive and/or support another component, a further rod, or the like. The respective attachment socket may be configured to provide a form-fit with the component, rod, system, connector, etc., attached to it.

According to an embodiment, the plurality of attachment sockets may be formed in a grid pattern. For example, an unwinding of the body and/or its shell surface may be considered, on which the plurality of attachment sockets may be formed in the grid pattern. If the rod is installed in a truss structure, it provides a plurality of attachment sockets arranged in a grid pattern. This further facilitates the attachment of components, further rods, connectors, etc., to the rod.

In an embodiment, the first number of attachment sockets and/or the second number of attachment sockets may comprise multiple attachment sockets arranged in a row. For example, the respective attachment sockets may be arranged in a respective row, wherein the row extends along the elongated extension of the rod and/or the body, i.e., along its longitudinal axis. The first number of attachment sockets may form a first row extending along the elongated extension. Likewise, the second number of attachment sockets may form a second row extending along the elongated extension. The first and second row of attachment sockets may be formed on different outer surfaces of the rod and/or body and in different circumferential sections of the rod and/or body. It is also conceivable that the body has, for example, a rectangular cross-section with four lateral outer surfaces, and a corresponding number of attachment sockets and/or rows are formed on each of the lateral outer surfaces, i.e., a total of four rows of attachment sockets each facing in different directions.

According to an embodiment, the first number of attachment sockets and the second number of attachment sockets are opposite to each other and/or oriented in directions facing away from each other. Thus, the rod may provide attachment options in mutually opposite directions.

In an embodiment, the body may have a round or circular cross-section, and the plurality of attachment sockets are formed over a circumferential surface at different circumferential positions and/or in different circumferential sections. This may provide a round rod with attachment options arranged circumferentially.

According to an embodiment wherein the body has an angular cross-section, and the plurality of attachment sockets are formed on different outer surfaces facing different directions. For example, the rod and/or body may have a rectangular cross-section, resulting in four lateral outer surfaces. A respective number of attachment sockets may be formed on at least two, or three, or all of the lateral outer surfaces. This may provide a round rod with attachment options arranged circumferentially.

In an embodiment, an attachment socket of the plurality of attachment sockets may be formed on at least one of longitudinal end faces of the rod and/or body. Thus, also in addition to attachment sockets arranged on the circumferential side, at least one attachment socket may also be formed at each of the longitudinal ends and/or end faces of the rod and/or body. When building a truss structure, two or more rods and/or one or more rods and a connector may be attached to each other lengthwise. For example, T-junctions or the like may be built.

According to an embodiment, at least one of the plurality of attachment sockets may comprise at least one coupling interface arranged in the respective attachment socket. The at least one coupling interface may be configured to couple any component docked and/or attached to the respective attachment socket to the rod. The at least one coupling interface may be configured in many ways. For example, it may be formed by one or more coupling openings configured to be engaged by a locking-pin of a component to be attached. Alternatively or additionally, the at least one coupling interface may be configured as a form-fit connection, a bushing, a threaded insert, nut or the like, a rotary nut, a feedthrough, or the like. The at least one coupling interface may be standardized across the entire plurality of attachment sockets, or different coupling interfaces may be provided to different attachment sockets.

In an embodiment, the at least one coupling interface may be configured as a fastening interface, an electrical interface, and/or feedthrough. For example, in case of a fastening interface, the at least one coupling interface may be configured as a coupling opening, a clamp, a thread, a screw element, a form-fit part, a snap-fit part, a bushing, a rotary nut, or the like. Further, in case of an electrical interface, the respective attachment socket may serve as a kind of power socket, network socket, or the like. A component to be attached to it may have a correspondingly configured counter interface. A cable for connecting the electrical interface may be guided inside the rod. A fluid line, cable, or the like, for example, may be passed through or connected to the feedthrough.

According to an embodiment, the body may be a press formed part at which the plurality of attachment sockets is integrally formed. For example, it may be a deep drawn part, a thermoformed part, or a compression molding part. These manufacturing processes require only simple tools and little work and/or material. By way of example, the rod, and particularly its body, may be formed from at least one layer that is formed by any suitable forming process. The at least one layer may be bent and/or wrapped to the body. Ends of the at least one layer, or ends of multiple layers may then be coupled to each other, for example, by welding, riveting, screwing, or the like. The body may be closed or at least partially open. Opposing attachment sockets may be coupled to each other at their respective body sections.

Alternatively, the rod, and particularly its body, may be solid. In this case, the plurality of attachment sockets may be formed by a machining process. Or there may be a solid core with at least one layer wrapped around it and coupled to it.

In an embodiment, the rod may comprise an internal air passage, an internal conduit passage, and/or an internal cable passage. In other words, the rod may additionally be used for guiding air, e.g., of a climate system of the vehicle, as support for an electric cable and/or a data cable, etc.

According to a second aspect, there is provided a system for a truss structure of a vehicle. The system comprises at least one rod according to the first aspect. Further, the system comprises at least one connector configured to be attached and/or coupled, e.g., attached and/or fastened, to at least one attachment socket of the plurality of attachment sockets of the rod.

The proposed system allows the building of a flexible and freely configurable truss structure. Multiple rods may be coupled and/or connected to each other in the manner of a truss structure. The truss structure built up in this way may be easily attached, reinforced or generally offers a plurality of attachment options due to the plurality of attachment sockets formed on the respective rod. The at least one connector may be configured for any type of node of the truss structure.

According to an embodiment, the at least one connector may comprise an end face connector configured to couple the at least one rod to at least one further rod via respective longitudinal end faces of the rods. This allows the building of a multi-node.

In an embodiment, the at least one connector comprises a lateral connector configured to couple the at least one rod to at least one further rod via respective outer sides of the rods. This allows another component, another rod, or the like to be attached to the respective rod from the lateral direction. For example, this may also be used to form reinforcements.

According to a third aspect, there is provided a vehicle comprising at least one rod according to the first aspect, and/or comprising a system according to the second aspect. The at least one rod is installed in an interior of the vehicle.

For example, the vehicle may be any kind of vehicle, such as a rail vehicle, an aircraft, spacecraft, a motor vehicle, or the like. The rod may be used to build a truss structure in the interior of the vehicle.

The invention will be explained in greater detail with reference to exemplary embodiments depicted in the drawings as appended.

BRIEF DESCRIPTION OF THE DRAWINGS

The present invention is explained in more detail below with reference to the embodiments shown in the schematic figures.

Figure 1:
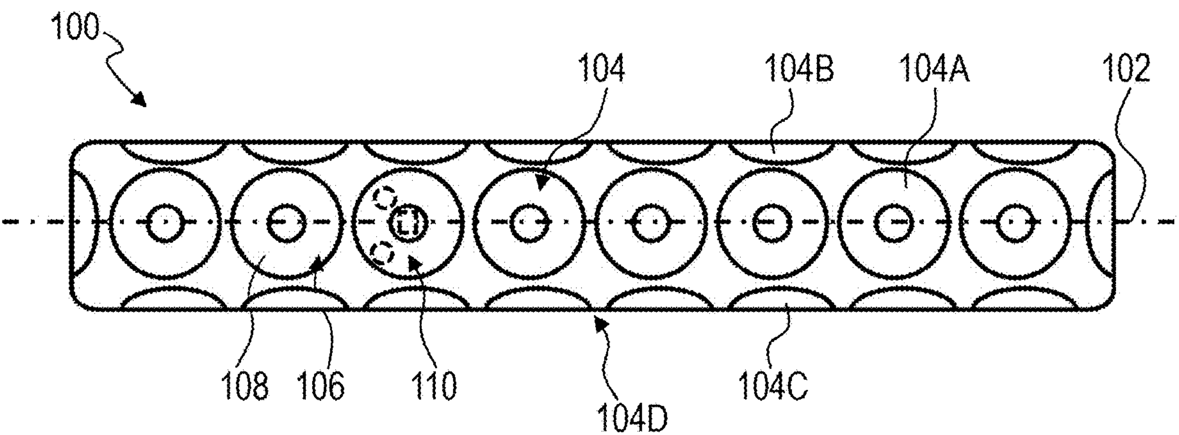
FIG. 1 illustrates in a top view an exemplary rod for a truss structure of a vehicle according to an embodiment.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

Figure 11:
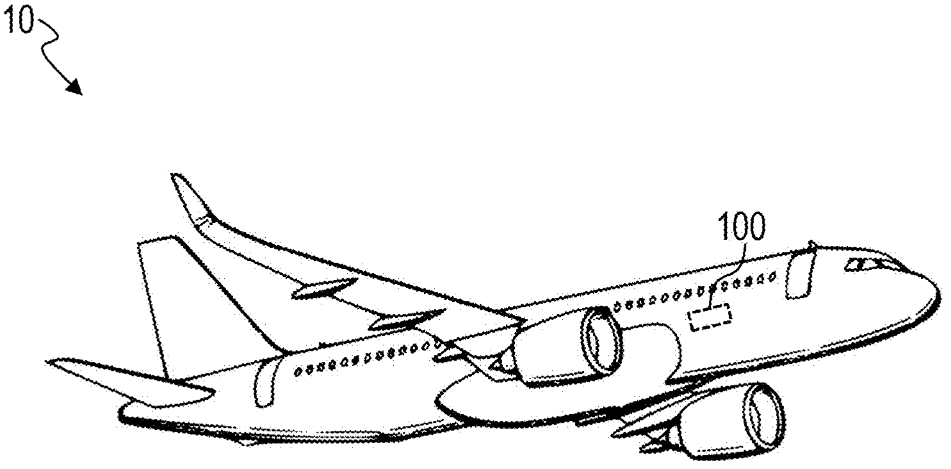
FIG. 11 illustrates an aircraft as an exemplary vehicle having installed a rod according to an embodiment.

FIG. 1 shows an exemplary rod 100 that may be used to build a truss structure for a vehicle 10 (see, e.g., FIG. 11). Accordingly, the rod 100 serve or may be configured as a truss rod, or the like.

The rod 100 comprises an elongated body. FIG. 1 indicates a longitudinal axis 102 of the rod 100 and/or its body. A plurality of attachment sockets 104 is formed on and distributed over an outer side of the body. The plurality of attachment sockets 104 comprises at least a first number of attachment sockets 104A facing in a first outward direction and a second number of attachment sockets 104B facing in a second outward direction different from the first direction. Merely by way of example, the rod 100 according to FIG. 1 comprises a total of four numbers of attachment sockets 104A, 104B, 104C and 104D, each of which faces in a direction different to the others. It is noted that the numbers of attachment sockets are not limited herein but may depend on, e.g., a cross-section of the rod, so that the respective number of attachment sockets may be formed on only two outer surfaces or circumferential sections of the rod 100 and/or its body. Referring to FIG. 1, the plurality of attachment sockets 104 faces perpendicularly away from the longitudinal axis 102. Since the numbers of attachment sockets 104A, 104B, 104C, 104D face in different directions, they may be docked by a component to be attached to the rod 100 from different directions. For example, attachment sockets 104 may be configured to attach thereto any component, connector, further rod, or the like. The configuration, such as a form and/or shape, of the plurality of attachment sockets 104 may be standardized, may be identical across the plurality of attachment sockets 104, or may be different across the plurality of attachment sockets 104. It is also conceivable that the first number of attachment sockets 104A has a first configuration and the second number has second configuration different to the first configuration, etc. Each of the plurality of attachment sockets 104 each comprises a cavity 106 open to the outer side of the body and comprising at least one bearing surface 108. The cavity 106 may be configured to at least partially receive the component to be attached, which may have a corresponding plug or the like to dock at the respective attachment socket. The bearing surface 108 may be configured to support the component to be attached when received in the respective attachment socket and/or in its cavity 106.

Considering an unwinding of the rod 100 and/or its body according to FIG. 1, it is understood that the plurality of attachment sockets is formed in a grid pattern. Further, as can be seen from FIG. 1, the first number of attachment sockets 104A and/or the second number of attachment sockets 104B comprises multiple attachment sockets arranged in a row. In FIG. 1, the respective rows extend along the longitudinal axis 102. Also, the first number of attachment sockets 104A and the second number of attachment sockets 104B are opposite to each other and/or oriented in directions facing away from each other. In this exemplary embodiment, the first number, second number, third number, and fourth number of attachment sockets 104A-104D are opposite each other pairwise. Optionally, numbers of attachment sockets opposing each other may be in a one-to-one correspondence. Further, numbers of attachment sockets 104 opposing each other may be connected to each other at their respective body sections. In other words, opposing attachment sockets 104 may be coupled to each other.

In at least some embodiments, at least one longitudinal end faces of the rod 100 and/or its body may comprise an attachment socket of the plurality of attachment sockets 104. In the exemplary embodiment illustrated in FIG. 1, both longitudinal end faces of the rod 100 comprise a respective attachment socket. It is noted that the attachment socket formed at the longitudinal end face may be configured different to the numbers of attachment sockets formed at the lateral surface or circumference of the rod 100, or may be identical thereto.

In at least some embodiments, at least one of the plurality of attachment sockets 104 may comprise at least one coupling interface 110 arranged in the respective attachment socket 104. The at least one coupling interface 110 may be configured to couple any component docked and/or attached to the respective attachment socket 104 to the rod 100. The at least one coupling interface 110 may be configured in many ways. For example, it may be formed by one or more coupling openings (as indicated in FIG. 1 by circles in dashed lines) configured to be engaged by a locking-pin or the like of a component to be attached. Alternatively or additionally, the at least one coupling interface 110 may be configured as a form-fit connection, a bushing, a threaded insert, nut or the like, a rotary nut, a feedthrough, or the like (as indicated in FIG. 1 by a rectangle in dashed lines). The at least one coupling interface 110 may be standardized across the entire plurality of attachment sockets 104, or different coupling interfaces may be provided to different attachment sockets of the plurality of attachment sockets 104. In at least some embodiments, the at least one coupling interface may be configured as a fastening interface, an electrical interface, and/or feedthrough. For example, in case of a fastening interface, the at least one coupling interface may be configured as a coupling opening, a clamp, a thread, a screw element, a form-fit part, a snap-fit part, a bushing, a rotary nut, or the like, configured to fasten a component to be attached to the rod 100. Further, in case of an electrical interface, the respective attachment socket 104 may serve as a kind of power socket, network socket, or the like. A component to be attached to it may have a correspondingly configured counter interface. A cable for connecting the electrical interface may be guided inside the rod. A fluid line, cable, or the like, for example, may be passed through or connected to the feedthrough.

For example, the rod 100 and/or its body may be a press formed part at which the plurality of attachment sockets 104 is integrally formed. For example, it may be a deep drawn part, a thermoformed part, or a compression molding part. These manufacturing processes require only simple tools and little work and/or material. By way of example, the rod, and particularly its body, may be formed from at least one layer that is formed by any suitable forming process. The at least one layer may be bent and/or wrapped to the body. Ends of the at least one layer, or ends of multiple layers may then be coupled to each other, for example, by welding, riveting, screwing, or the like. The body may be closed or at least partially open. Opposing attachment sockets 104 may be coupled to each other at their respective body sections.

Alternatively, the rod 100 and/or its body, may be solid. In this case, the plurality of attachment sockets 104 may be formed by a machining process. Or there may be a solid core with at least one layer wrapped around it and coupled to it.

Figure 2:
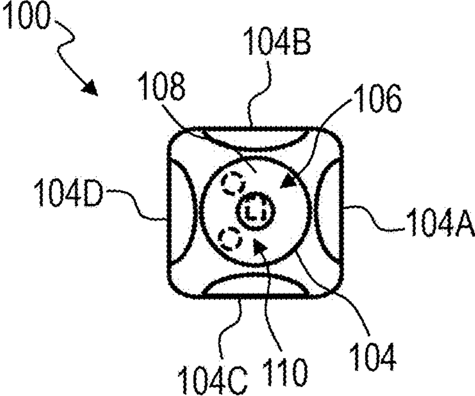
FIG. 2 illustrates the rod of FIG. 1 in a side view.

FIG. 2 shows the rod 100 of FIG. 1 in a side view. In this exemplary embodiment, the rod 100 and/or its body has an angular cross-section, e.g., a rectangular cross-section. As mentioned above, at least one of the longitudinal end faces, which emerges here from the sheet plane, may comprise an attachment socket 104.

Figure 3:
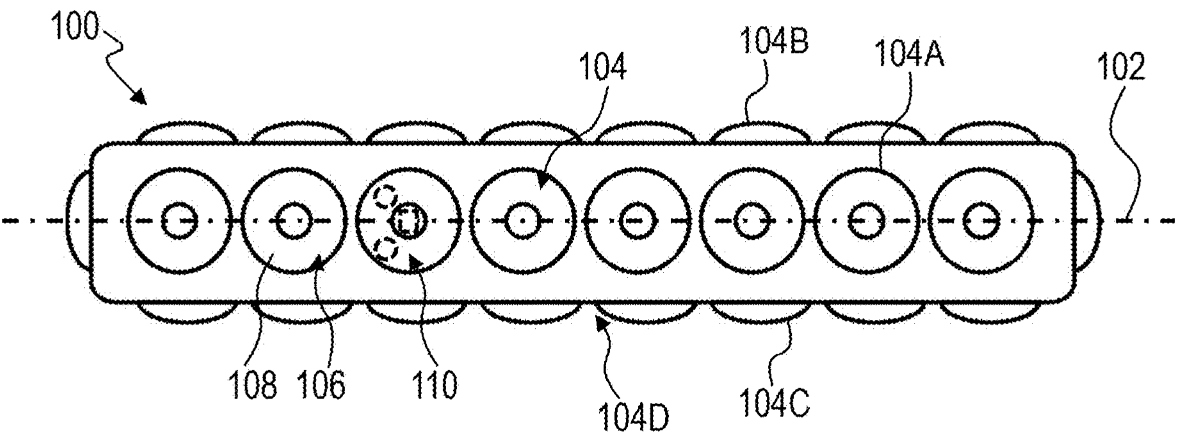
FIG. 3 illustrates in a top view an exemplary rod for a truss structure of a vehicle according to an embodiment.
Figure 4:
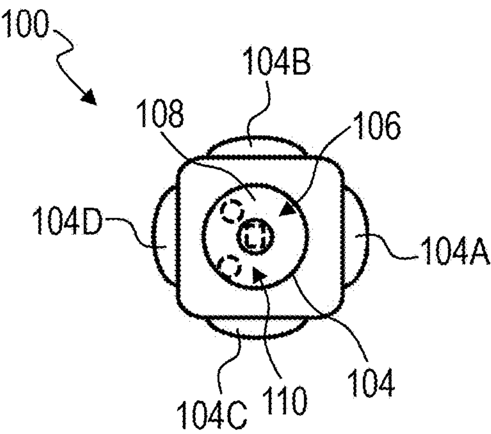
FIG. 4 illustrates the rod of FIG. 3 in a side view.

FIG. 3 and FIG. 4 illustrate another example of the rod 100. This is at least substantially the same as described above. Deviating from the above, here the plurality of attachment sockets 104 is formed convex, while in the exemplary embodiment according to FIG. 1 and FIG. 2 they are formed concave. Otherwise, the above description applies, which does not need to be repeated here.

It is noted that although the above examples of the rod 100 have an angular cross-section, the rod 100 may also have a round cross-section.

Figure 5:
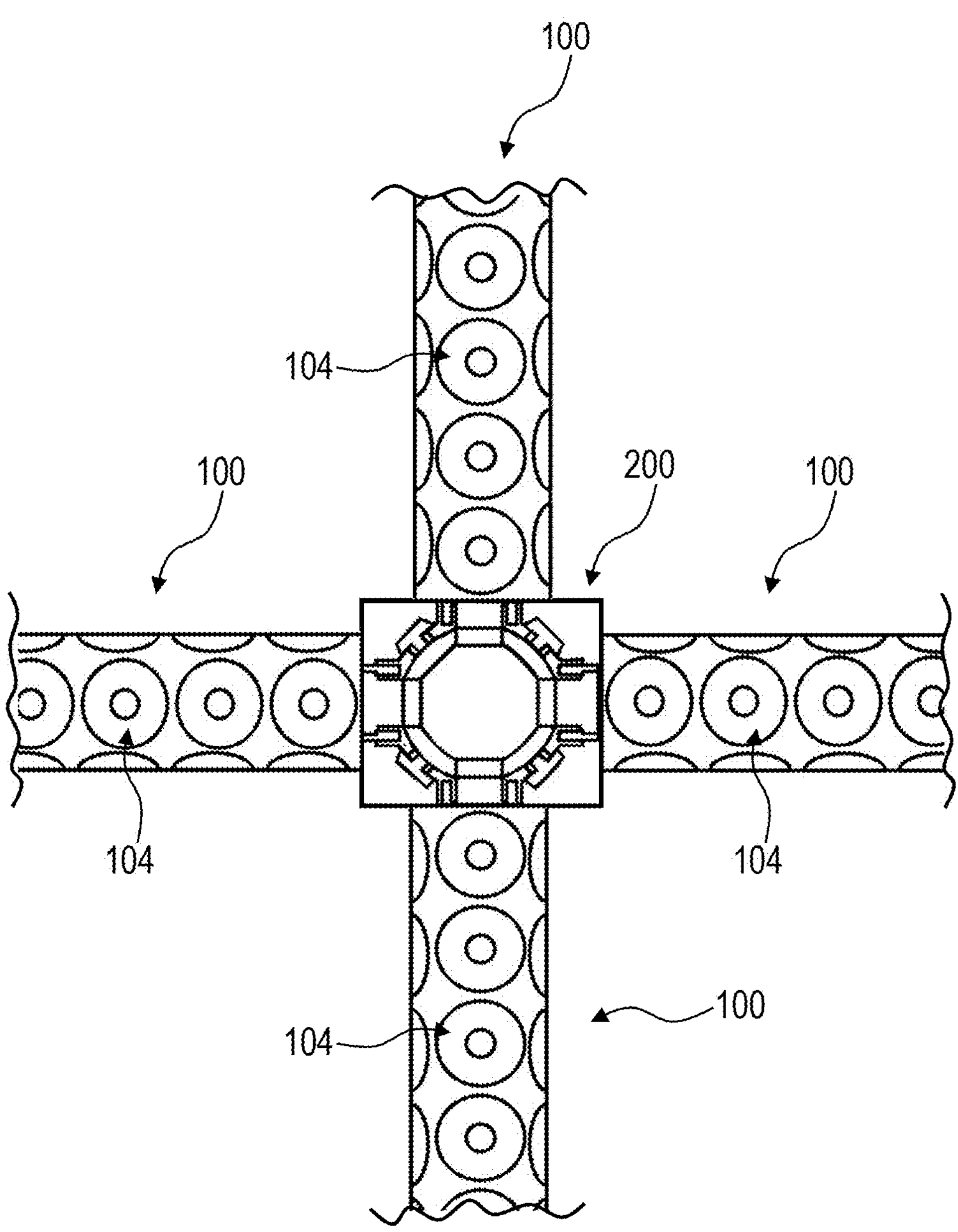
FIG. 5 illustrates a system comprising multiple rods and a connector according to an embodiment, forming a truss structure.

FIG. 5 illustrates a system for building a truss structure comprising the rod 100. Basically, FIG. 5 illustrates a possible application scenario of the rod 100, where it is used to build a truss structure.

Besides the rod 100, the system and/or truss structure comprises a connector 200 configured to couple two or more rods 100 together. Merely by way of example, FIG. 5 shows a node of the truss structure in which a total of four rods 100 are connected to each other via the connector 200. The connector 200 may be configured to be attached to at least one attachment socket of the plurality of attachment sockets 104 of the respective rod 100. In this example, a respective longitudinal end of the rods 100 is coupled to the connector 200.

The connector 200 may have any configuration suitable for this purpose. For example, the connector 200 may comprise a corresponding plug, interface, or the like, configured to be docked and/or attached to the plurality of attachment sockets 104 of the respective rod 100. Merely by way of example, reference is made to the European patent application EP 4 187 110 A1 mentioned in the introduction, which is hereby incorporated by reference in its entirety. This exemplary connector describes an articulated connector comprising an outer cage, at least two first connecting rods each having a first socket at one end, and a sliding means. The outer cage has a plurality of first openings lying in a first common plane and configured to pass the first connecting rods outwardly from an inner side of the outer cage. The first openings are dimensioned such that the first sockets each have a first outer surface in flush surface contact with a first inner edge surface of one of the first openings, wherein the sliding means is adapted to make flush surface contact with first inner surfaces of the first sockets such that the flush surface contacts are maintained with the first inner edge surfaces.

With reference to FIG. 5, it can be understood that in the truss structure formed in this way, a plurality of attachment options for other components, optionally also further rods 100, are available through the plurality of attachment sockets 104. As described herein, the plurality of attachment sockets 104 of each rod 100 may be used to attach and/or fasten another component to the respective rod 100, and/or may be used as an electric power socket, a network and/or data socket (if the respective attachment socket 104 is correspondingly connected), etc.

Figure 6:
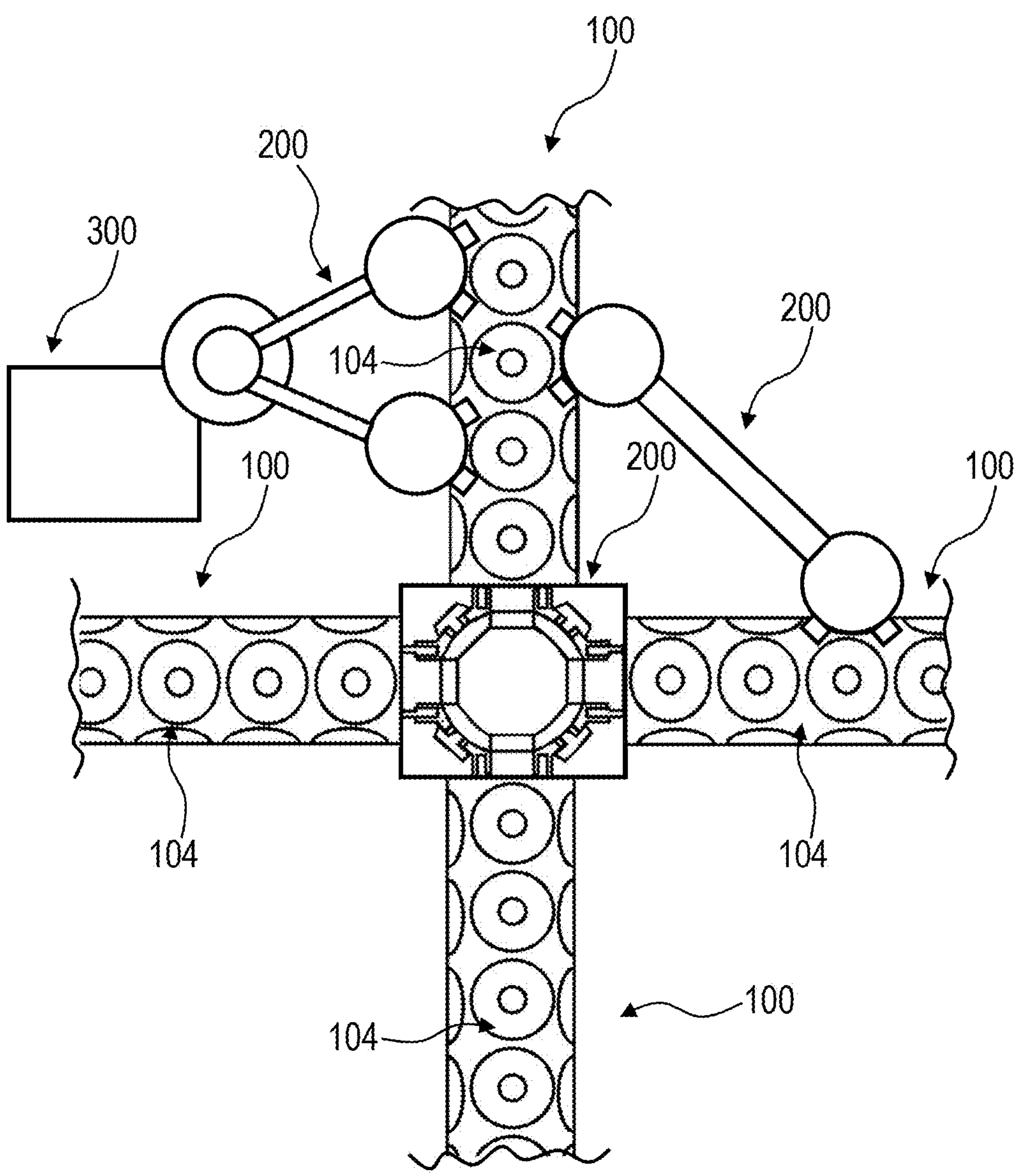
FIG. 6 illustrates a system comprising multiple rods and multiple connectors according to an embodiment, forming a truss structure.

FIG. 6 illustrates another example of the system for building a truss structure comprising the rod 100. Basically, FIG. 6 illustrates another possible application scenario of the rod 100, where it is used to build a truss structure.

Deviating from the above, the system comprises further possible configurations of the connector 200. As exemplarily illustrated in FIG. 6, the connector 200 may be alternatively or additionally configured to couple a component 300 to the respective rod 100 via at least one attachment socket 104 of the respective rod 100. Such configuration of the connector 200 may be referred to as lateral connector. For example, the connector 200 may be configured, e.g., may have a respective counter coupling interface or the like, to be fastened to the respective rod 100 when docked to the respective at least one attachment socket 104. As described herein, such a coupling interface, e.g., the above coupling interface 110, may be of the form-fit and/or force-fit type, snap-fit, screw-fit, clamp-fit, or other suitable connection type.

Merely by way of example, the component 300 to be attached to the truss structure and/or the respective rod 100 may be a cabin component, such as an overhead stowage compartment, or the like. This is not limited herein.

Further, as exemplarily illustrated in FIG. 6, the connector 200 may be alternatively or additionally configured to reinforce the truss structure by coupling two rods 100 together via an angle or corner. Such configuration of the connector 200 may be referred to as lateral connector. In the illustrated example, the connector 200 on the right side may reinforce the truss structure to attach the component and/or system 300 thereto. Based on this example, the system allows many different combinations of rods 100 and one or more connectors 200 as well as components and/or systems 300.

Figure 7:
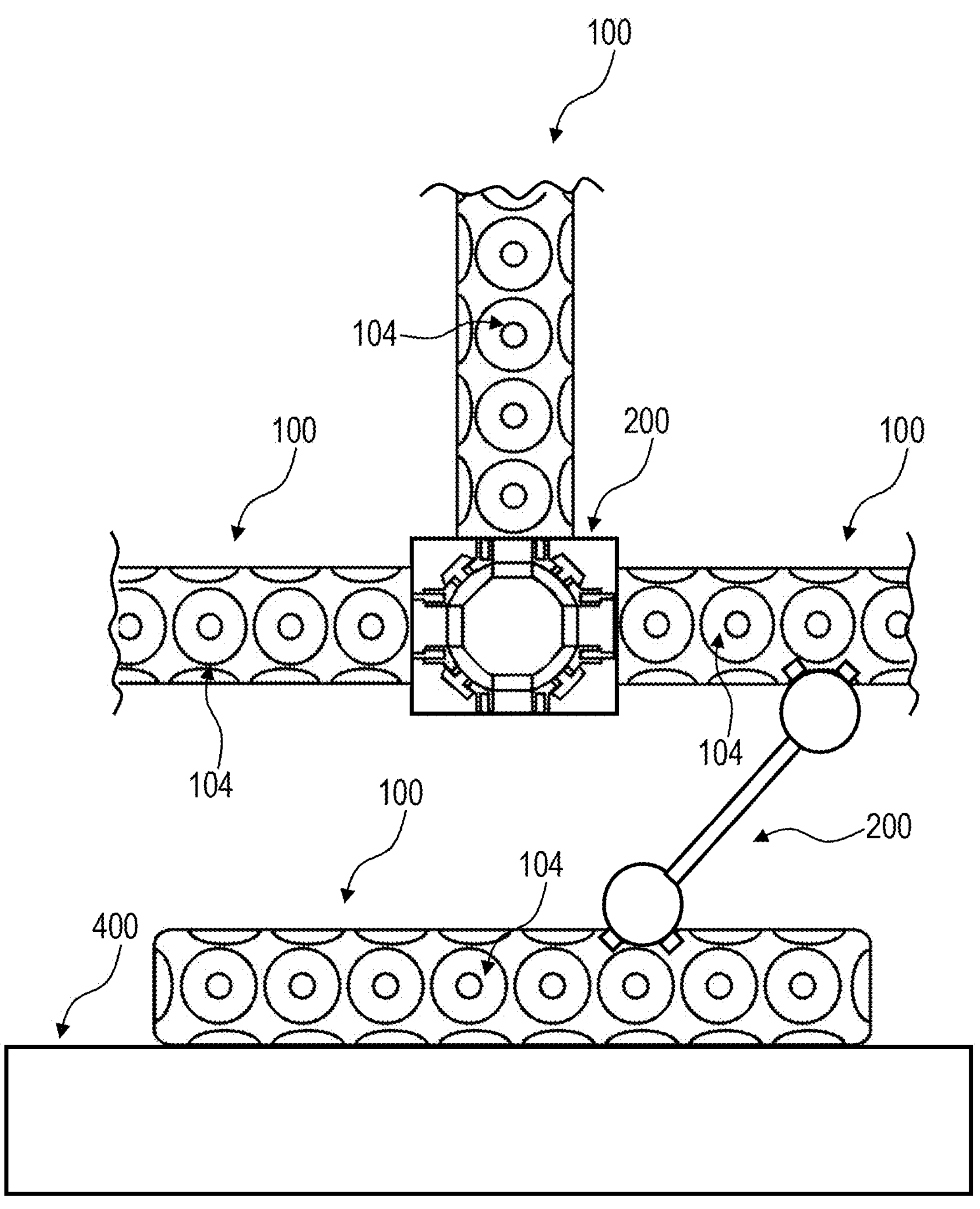
FIG. 7 illustrates a system comprising multiple rods and multiple connectors according to an embodiment, forming a truss structure.

FIG. 7 illustrates another example of the system for building a truss structure comprising the rod 100. Basically, FIG. 7 illustrates another possible application scenario of the rod 100, where it is used to build a truss structure.

Deviating from the above, the truss structure, and/or any rod 100 thereof, may be coupled, e.g., attached and/or fastened, to a supporting structure 400, such as a cabin monument, or the like, via the connector 200. Based on this example, the system allows many different combinations of rods 100 and one or more connectors 200 as well as supporting structures 400.

Figure 8:
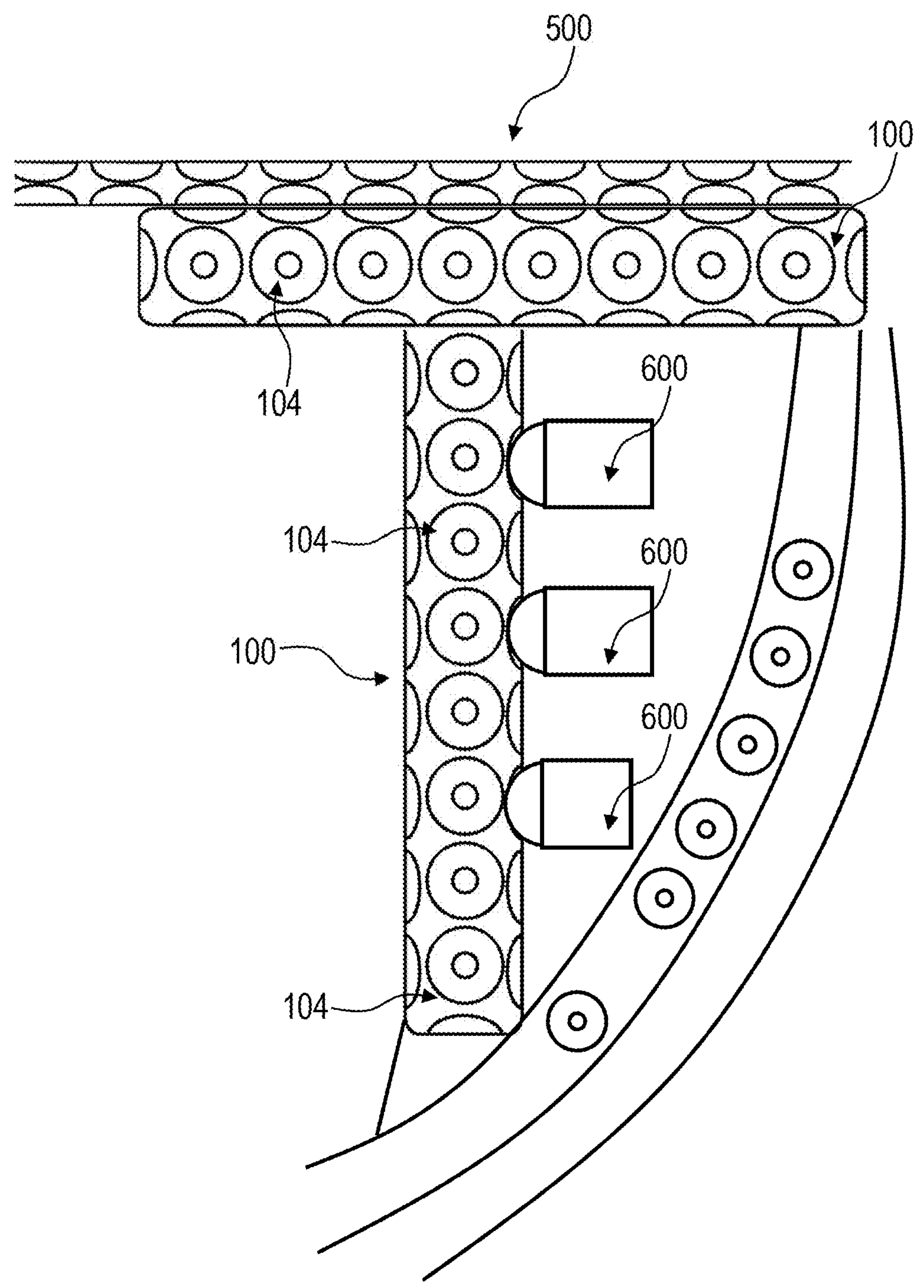
FIG. 8 illustrates a system comprising multiple rods and multiple connectors according to an embodiment, forming a truss structure.

FIG. 8 illustrates another example of the system for building a truss structure comprising the rod 100. Basically, FIG. 8 illustrates another possible application scenario of the rod 100, where it is used to build a truss structure.

In this example, the truss structure built by using the rod 100 is used to carry a floor 500 of the vehicle. For example, the floor 500 may comprise a panel configured in correspondence to the rod 100. By way of example, the panel may comprise a first layer and a second layer coupled to each other. A plurality of attachment sockets may be formed in a two-dimensional grid pattern in at least one of the first layer and the second layer. Each of the plurality of attachment sockets may comprise a cavity open to an outer side of the respective layer and extending into a space between the first layer and the second layer. The cavity comprises at least one bearing surface. In other words, the floor 500, particularly a respective panel thereof, may be configured compatible to the rod 100, e.g., having corresponding attachment sockets, etc. Accordingly, the floor 500 and/or its panel may be coupled to the rod 100 via the at least one connector 200 or any other suitable means.

Further, by way of example, a respective one of the rods 100 may be used to attach thereto another equipment or system 600 of the vehicle 10, such as any ATA system. For instance, the rod 100 may be used to attach thereto an ATA-21 system or the like.

Figure 9:
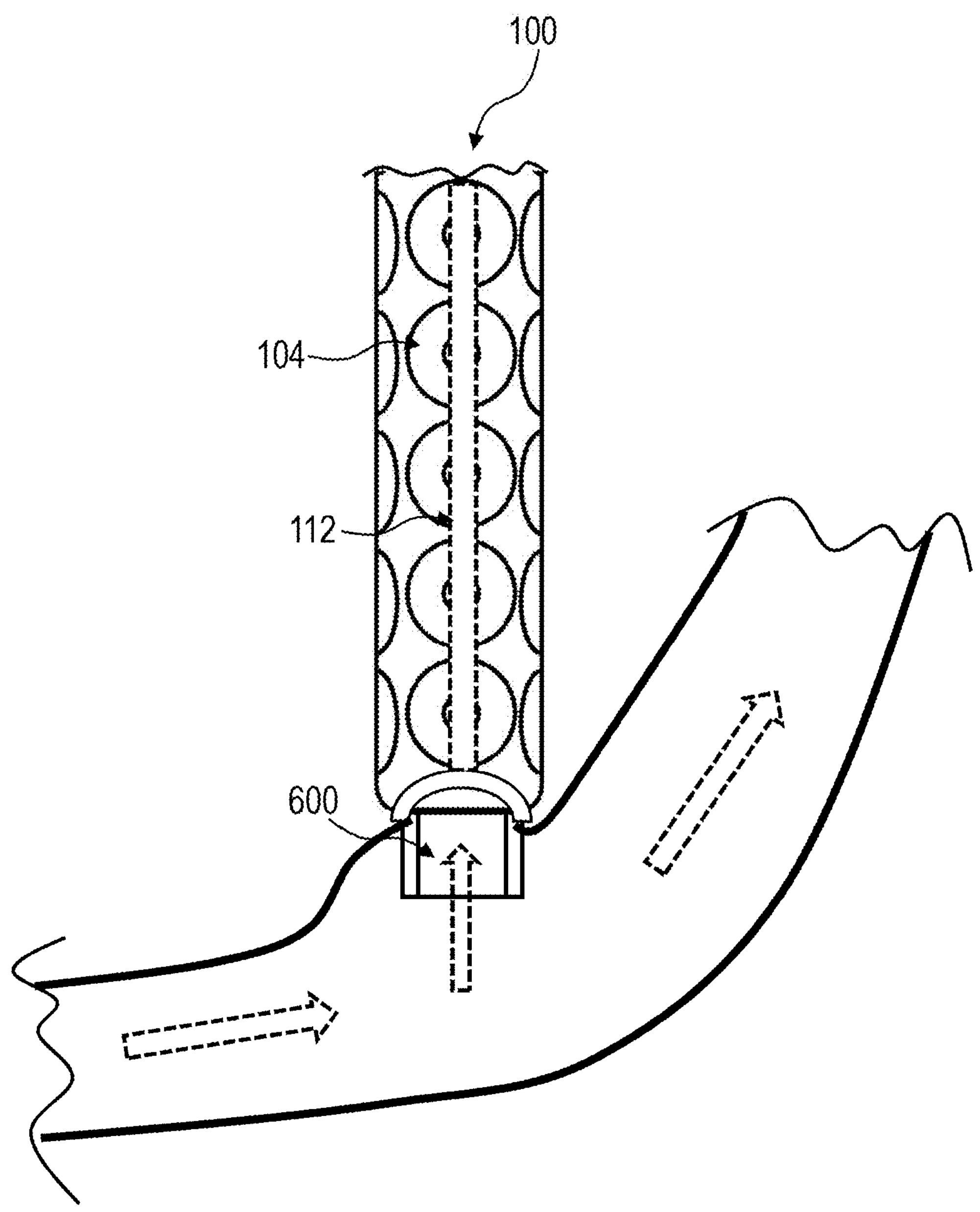
FIG. 9 illustrates a system comprising multiple rods and multiple connectors according to an embodiment, forming a truss structure.

FIG. 9 illustrates another example of the system for building a truss structure comprising the rod 100. Basically, FIG. 8 illustrates another possible application scenario of the rod 100, where it is used to build a truss structure.

In this example, the rod 100 may comprise an internal air passage, an internal conduit passage, and/or an internal cable passage, designated in FIG. 9 by reference sign 112. FIG. 9 illustrates a correspondingly configured coupling section 600, using the example of an air duct structure of an air conditioning system. Here, the rod 100 may be used for guiding and/or delivering air. In FIG. 9, an exemplary air flow is indicated with dashed arrows.

Figure 10:
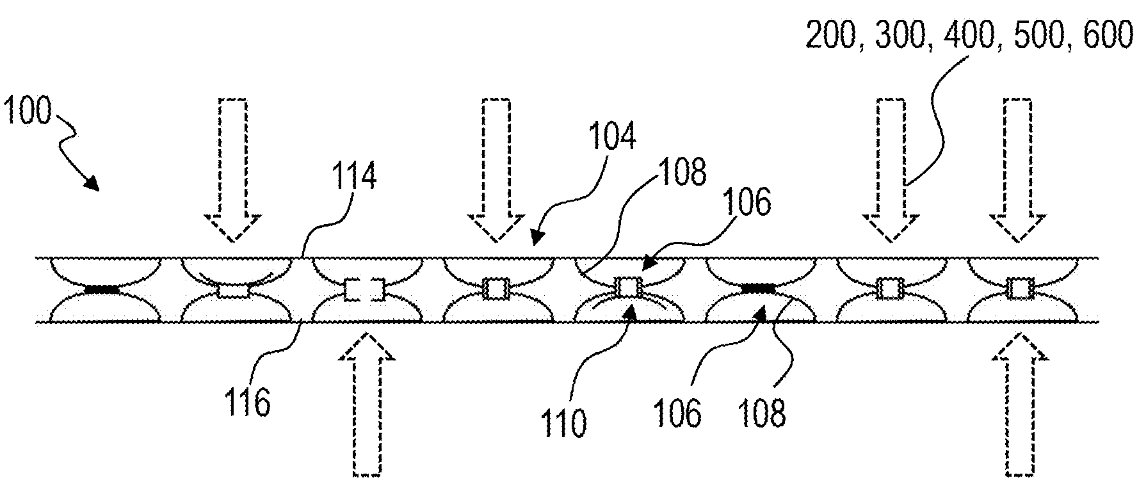
FIG. 10 illustrates an exemplary configuration of a rod according to an embodiment.

FIG. 10 illustrates an exemplary configuration of the rod 100. The rod 100 may be a press formed part comprising at least one layer, wherein FIG. 10 exemplarily illustrates a first layer 114 and a second layer 116. In the at least one layer, e.g., in each of the layers 114, 116, the plurality of attachment sockets 104 may be integrally formed. The at least one layer may then be bent or wrapped into the rod-shape to form the rod 100. Ends of the at least one layer bent or wrapped into the rod-shape may then be coupled to each other, e.g., by welding, riveting, screwing, or the like. Also, as exemplarily indicated in FIG. 10, bottom sections of two opposing cavities 106 may be coupled to each other. Further, in at least some embodiments, the at least one coupling interface 110 may be arranged to be accessible via each one of two opposing cavities 106, thereby connecting the two opposing cavities 106 with each other. It is noted that the above-mentioned floor 500 and/or its panel may have a similar or the same configuration as illustrated in FIG. 10.

It is noted that the respective cavities 106, especially when arranged opposing each other, may also be referred to as a core of the rod 100, since the cavities 106 may provide bending stiffness to the rod 100. As in this example, the cavities 106 have an at least substantially spherical shape, they may also be referred to as bubble core.

Further, it is noted that although the cavities 106 are exemplarily illustrated to have an at least substantially spherical shape, the cavities 106 may also have an angular shape.

FIG. 11 illustrates an aircraft as an exemplary vehicle 10 having installed the rod 100 described herein. For example, the rod 100 may be used in the vehicle 10, for building a truss structure.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 vehicle (e.g., aircraft)
100 rod
102 longitudinal axis
104 attachment socket(s)
104A (number of) attachment socket(s)
104B (number of) attachment socket(s)
104C (number of) attachment socket(s)
104D (number of) attachment socket(s)
106 cavity
108 bearing surface
110 coupling interface
112 (internal) passage
114 first layer
116 second layer
200 connector
300 component and/or system
400 supporting structure
500 floor (e.g., panel)
600 equipment and/or system

The invention claimed is:

1. A rod for a truss structure of a vehicle, the rod comprising:

an elongated body having a plurality of attachment sockets formed on and distributed over an outer side of the body, the plurality of attachment sockets comprising:

at least a first number of attachment sockets facing in a first direction, and a second number of attachment sockets facing in a second direction different from the first direction, and the plurality of attachment sockets each comprising:

a cavity open to the outer side of the body, and at least one bearing surface.

2. The rod of claim 1, wherein the plurality of attachment sockets is formed in a grid pattern.

3. The rod of claim 1, wherein at least one of the first number of attachment sockets or the second number of attachment sockets comprises multiple attachment sockets arranged in a row.

4. The rod of claim 1, wherein the first number of attachment sockets and the second number of attachment sockets are arranged at least one of opposite to each other or oriented in directions facing away from each other.

5. The rod of claim 1, wherein the body has a round or circular cross-section, and the plurality of attachment sockets are formed over a circumferential surface at different circumferential positions.

6. The rod of claim 1, wherein the body has an angular cross-section, and the plurality of attachment sockets are formed on different outer surfaces facing different directions.

7. The rod of claim 1, wherein at least one attachment socket of the plurality of attachment sockets is formed on at least one longitudinal end face of the body.

8. The rod of claim 1, wherein the body is a press formed part at which the plurality of attachment sockets is integrally formed.

9. The rod of claim 1, wherein the rod comprises at least one of an internal air passage, an internal conduit passage, or an internal cable passage.

10. The rod of claim 1, wherein at least one of the plurality of attachment sockets comprises at least one coupling interface arranged therein.

11. The rod of claim 10, wherein the at least one coupling interface is configured as at least one of a fastening interface, an electrical interface, or feedthrough.

12. A system for a truss structure of a vehicle, comprising:
at least one said rod according to claim 1; and
at least one connector configured to be attached to at least one attachment socket of the plurality of attachment sockets of the rod.

13. The system of claim 12, wherein the at least one rod is at least one first rod and the at least one connector comprises an end face connector configured to couple the at least one first rod to at least one second rod via respective longitudinal end faces of the at least one first rod and the at least one second rod.

14. The system of claim 12, wherein the at least one rod is at least one first rod and the at least one connector comprises a lateral connector configured to couple the at least one first rod to at least one second rod via respective outer sides of the at least one first rod and the at least one second rod.

15. A vehicle comprising the system according to claim 12, installed in an interior of the vehicle.

16. A vehicle comprising at least one panel having at least one said rod according to claim 1 connected thereto.

* * * * *